Figure 1:
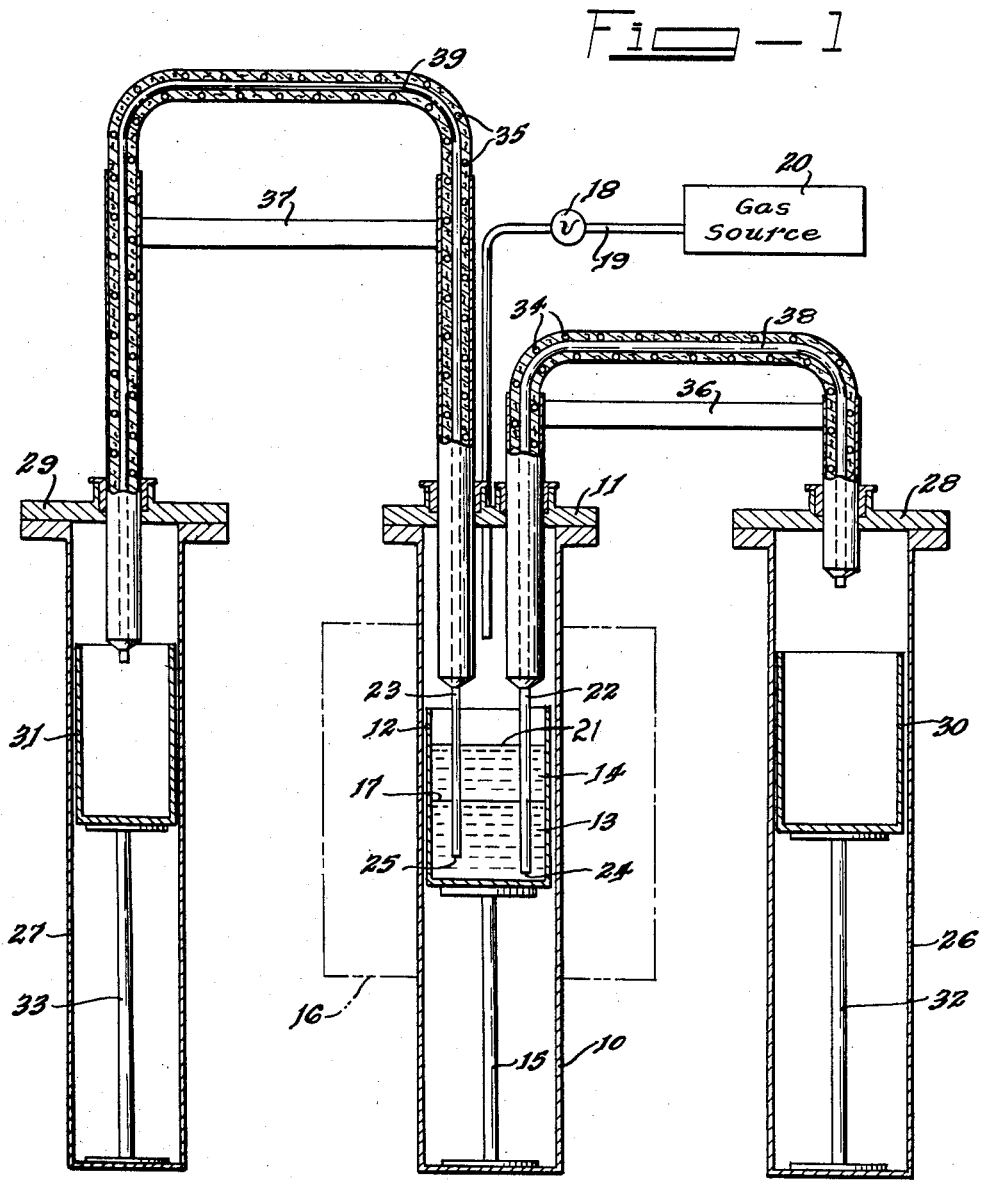

May 4, 1965     J. C. HESSON     3,181,700

IMMISCIBLE LIQUIDS SEPARATOR

Filed April 26, 1962     2 Sheets-Sheet 1

INVENTOR.
James C. Hesson
BY
Attorney

United States Patent Office 3,181,700
Patented May 4, 1965

3,181,700
IMMISCIBLE LIQUIDS SEPARATOR
James C. Hesson, Riverdale, Ill., assignor to the United States of America as represented by the United States Atomic Energy Commission
Filed Apr. 26, 1962, Ser. No. 190,508
2 Claims. (Cl. 210—175)

The invention relates to a novel apparatus for separating immiscible liquids, more particularly to an apparatus for separating molten metals and molten ceramics with a high degree of precision, reliability, and a minimum of manipulation.

Methods now in use for separating immiscible liquids have serious shortcomings. They depend on accurate determination such as visual sighting of the interface between the liquids, and prompt action by an operator as soon as the interface comes near to a drain or outlet, or else the product will not be pure. Such methods therefore require the presence of an attendant when it is concluded and cannot be set up and left to run by itself after working hours, such as overnight. This results in an increase of both labor and equipment costs over the costs of an automatic process, if that could be devised.

These shortcomings are all the more serious when applied to molten metals and molten ceramics. Visual sighting of the interface between materials of this kind is out of the question, and available methods of determining the location of the interface are complicated and not always satisfactory. The position of an interface between a molten metal and a molten ceramic may be determined by comparative electrical resistance methods, but these require complex electrical circuits and measuring devices. Resistance methods are of no use in locating the interface between two molten metals, and pressure differential methods must be resorted to, with a complicated arrangement of manometers.

Numerous separations of molten metals and ceramics are required in the pyrometallurgic processing and reprocessing of radioactive materials, especially in the reprocessing of spent fuels from "breeder" nuclear reactors. Molten zinc, magnesium, calcium, cadmium and other metals are used singly or together at some stage of the various reprocessing schemes for such fuels, and two or more of these require separation from each other, or from a molten ceramic slag or flux. The latter is often the more valuable of the liquids to be separated since the fuels are often in oxide, carbide or other ceramic form and thus tend to be found in the ceramic phase. In any event, it is frequently necessary to separate the liquids mentioned under radioactive conditions, which means that the separations must be carried out in "caves," or enclosures of heavy shielding where manipulation is by remote control and visual sighting either impossible or at least highly unsatisfactory. Because of the hazards involved, as well as the economic value of the nuclear materials, separations of this general class must be precise and yet be carried out with a minimum of manipulation, and without the need for locating the interface by complicated methods.

It is accordingly, the general object of the invention to provide an apparatus for separating immiscible liquids.

It is a more particular object to provide an apparatus for precisely separating immiscible molten metals and molten ceramics which may be operated without resort to complicated methods of determining the position of the interface between liquids and with a minimum of manipulation.

It is a still more particular object to provide an apparatus for precisely separating radioactive mixtures of immiscible molten metals and molten ceramics which may be easily operated in a heavily shielded enclosure by remote control and without any provision for determining the position of the interface between liquids.

Other objects will become apparent as the description proceeds.

The foregoing objects are attained by my apparatus which can best be understood by reference to the accompanying figures of the drawings.

Figure 2:
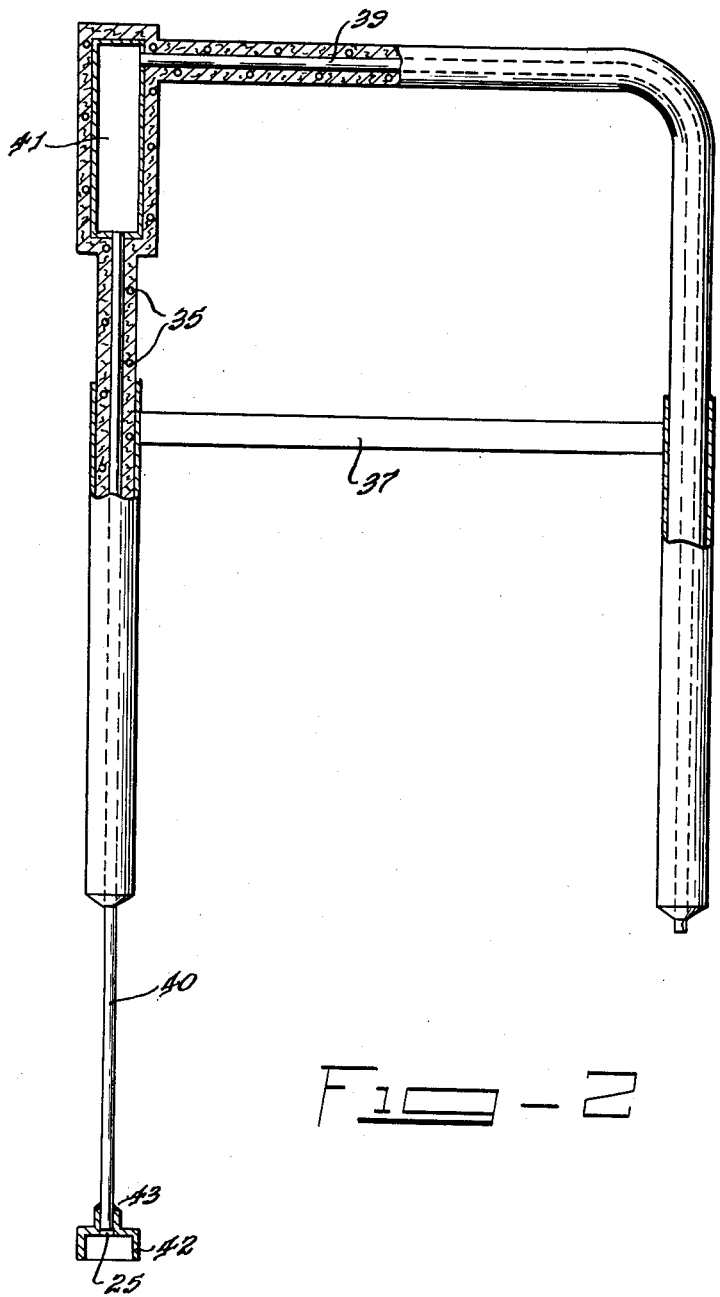

FIG. 1 is a general elevational view of my novel apparatus, partly in section; and FIG. 2 is a partly sectional view of a modification of a portion of the apparatus of FIG. 1.

Referring to FIG. 1, the numeral 10 designates a gas-tight enclosure, or bomb, of stainless steel, having a lid 11 fastened by bolts (not shown). Within the bomb 10 is a stainless steel crucible 12 which serves as a mixture-containing vessel for the mixture of immiscible liquids to be separated, such as molten cadmium 13 and molten ceramic flux 14. Crucible 12 rests on stand 15 and the molten state of the liquids is maintained by electric furnace heating means 16.

Before the start of the process the molten metal 13 will occupy the lower part of the crucible 12 and the ceramic flux 14 the upper part, the boundary between them being the interface 17. A gas line 19 containing a valve 18 extends between a gas source 20 and bomb 10 making it possible to increase the pressure in bomb 10.

Projecting into crucible 12 are heavy liquid, or molten metal, outlet line 22 of stainless steel and light liquid, or molten ceramic, outlet line 23 also of stainless steel, which terminate adjacent the bottom of crucible 12 in end-openings numbered correspondingly 24 and 25. It will be noted that opening 25 is somewhat higher than the opening 24; for convenience this difference in height will be referred to as $\Delta h_1$.

Lines 22 and 23 both lead upwardly out of crucible 12 and enclosure, or bomb 10, and in a generally U-shaped fashion lead into heavy liquid- or molten metal-receiving, enclosure 26, and light liquid- or molten ceramic-receiving, enclosure 27, respectively. These enclosures, unlike enclosure 10, are not gas tight, but have loosely fitting lids 28 and 29 to keep in fumes. Each enclosure has a receiving vessel, or crucibles 30 and 31, predominantly of graphite, resting on stands 32 and 33, respectively. Both lines 22 and 23 are closely surrounded by electrical resistance heaters 34 and 35, and their U-shape is braced by braces 36 and 37, respectively. It will be noted that the top of the U-shapes are not even; heavy liquid, or molten metal, outlet line 22 has a horizontal portion 38 which is lower than the coresponding horizontal portion 39 of light liquid, or molten ceramic, outlet line 23. For convenience, the difference in these heights will be referred to as $\Delta h_2$.

As can now be seen, when valve 18 is opened the gas pressure from gas source 20 increases that in bomb 10 against the surface of the liquids therein. These then tend to move downward, and the heavier liquid, or molten metal 13, will rise into both lines 22 and 23. The rise in line 23, however, will stop at or slightly above the highest part of line 22 and line 23 will thus be effectively blocked. The bulk of the heavy liquid will then flow through line 22, past 38, and into crucible 30. This will continue until the interface 17 falls to the level of the higher end-opening 25.

When the event just mentioned happens the lighter liquid, or molten ceramic 14, will begin to rise into the line or tube 23 and as it does so it will, since it is a lighter fluid, begin to displace the heavier liquid 13 already in the line. The heavier liquid 13 will thus begin to flow back into the crucible 12, and as the lighter liquid 14 occupies more of the line 23 the total weight of the column of liquid in the line 23 will begin to weigh less than the column of entirely heavy liquid 13 in the line 22, and hence, to equalize the pressure, the top of the liquid column in line 23 will begin to rise above the highest part of line 22, or 38. If now $\Delta h_2$ has been correctly determined, the weight of the liquid column in line 23 will become less than that in line 22 and the lighter liquid 14 will begin to flow around the U-shaped bend into the receiving enclosure 27 and crucible 31, and yet none of the heavier liquid 13 will accompany it since enough of the heavier liquid will have been displaced and drained back into the vessel or crucible 12 to make this impossible. Line 22, meanwhile, due to the greater weight of its column of liquid will be blocked.

In order for the result just described to be attained the inner diameter of the line 23 must be sufficiently large to permit the displacement of the heavier liquid by the lighter liquid and the flow in two directions to take place; this will vary with the liquids being separated, and, in general, the greater their difference in densities the smaller the inner diameter of the line 23 may be. However, in many separations, the difference in densities is not great, and yet it is desirable for the separations to be precise and complete. To care for this situation the alternate form of light liquid outlet line shown in FIG. 2 may be used.

Light liquid outlet line 40 as shown in FIG. 2 has all the essential features of line 23 including a heater 35, a horizontal portion 39, and the like. What distinguishes it from line 23 is the enlarged portion of its internal diameter 41 adjacent the horizontal portion 39 on the side of the mixture-containing vessel or crucible 31. Within this enlarged portion displacement of the heavier liquid 13 by the lighter liquid 14 is greatly facilitated, and it insures against any of the former being carried along by the latter into the receiving vessel.

A further feature which may also be used to modify the line 23 is the bell mouth 42, which may be used with or without the enlarged portion 41. This is welded as at 43 to the end-opening 25 to provide an opening of greater diameter. The greater diameter results in a decrease in the velocity of the fluid and hence lessens pick-up of drops of the heavier liquid, especially liquid metal which has a tendency to form small spherical drops which are easily entrained.

When $\Delta h_1$, $\Delta h_2$ and the inner diameter of the line 23 are correctly chosen my apparatus is capable of separating many mixtures of immiscible liquids. I have used it successfully to separate mercury from water, acetylene tetrabromide from water, carbon bisulfide from water, molten cadmium from molten ceramic flux and molten zinc from ceramic flux. The following Table I shows the various conditions which were used in several runs separating these pairs of liquids.

*Table I*

| Liquid pairs | Density | Outlet tube diameters | | $\Delta h_1$ | Temperature | $\Delta h_2$ | Gas source pressure |
|---|---|---|---|---|---|---|---|
| | | Light | Heavy | | | | |
| Water | 1 | ½" | ¼" to ½" | ¼" | 20° C | 4" | ½ p.s.i.g. |
| Carbon bisulfide | 1¼ | | | | | | |
| Water | 1 | ⅜" to ½" | ¼" to ½" | ¼" | 20° C | 10½" | 13" acetylene tetrabromide=1.7 p.s.i.g. |
| Acetylene tetrabromide | 2.96 | | | | | | |
| Water | 1 | ⅟₁₆" to ⅜" | ⅟₁₆" to ⅜" | ¼" | 20° C | 2" | 12" Hg=6–7 p.s.i.g. |
| Mercury | 13 | | | | | | |
| Dow 230 flux [1] | 2.0 | ¼" to ⅜" | ¼" to ⅜" | ⁷⁄₁₆"–½" | 500° to 650° C | 4½" to 14" | 6–8 p.s.i.g. |
| Cadmium | 7.7 | | | | | | |

[1] Dow 230 Flux is a composition 8–11 w/o BaCl₂, 2–5 w/o CaF₂, 4 w/o MgO, 6 w/o NaCl, 31–37 w/o MgCl₂, and the balance CaCl₂. It has a melting point of 440° C. and a melting point density of about 2.

My apparatus gives precise separations of immiscible liquids until the level 21 drops below the level of the higher end-opening 25. When this happens no liquid can rise into either tube since the lids 28 and 29 are not gas-tight, and thus there is no danger of any foreign liquid going into either receiving vessel, even if the apparatus is left unattended. The comparatively small amount of the mixture left in the vessel 12 below the level of 25 is not separated, to be sure, but this can be taken care of in the next run of the apparatus. In the case of molten materials, this can be cooled to form a heel, which may be melted with the next batch.

It will be understood this invention is not to be limited to the details given herein but that it may be modified within the scope of the appended claims.

What is claimed is:

1. Apparatus for separating a fixed volume of a mixture of immiscible liquids comprising a closed mixture-containing vessel having a single opening for the admission of the materials to be separated, means for sealing the opening, a heavy liquid-receiving vessel and a light liquid-receiving vessel, a heavy liquid outlet line having an opening adjacent the bottom of the mixture-containing vessel leading upwardly therefrom to a maximum height and thence downwardly into the heavy liquid-receiving vessel, a light liquid outlet line having an opening adjacent the bottom of the mixture-containing vessel and above the opening of the heavy liquid outlet line, the said light liquid outlet line leading upwardly out of the mixture-containing vessel to a maximum height higher than the maximum height of the heavy liquid outlet line, and thence downwardly to the light liquid receiving vessel, the light liquid outlet line containing a portion of enlarged cross-sectional area extending from a point adjacent the point of said light liquid outlet line maximum height and downwardly toward the light liquid outlet line opening in the mixture-containing vessel, and means for increasing the pressure in the mixture-containing vessel.

2. Apparatus for separating a mixture of molten metal from immiscible molten ceramic, comprising a gas-tight enclosure, a mixture-containing vessel within the enclosure, a heating means closely surrounding the enclosure, a molten metal-receiving vessel, a molten ceramic-receiving vessel, a molten metal outlet line having an end opening adjacent the bottom of the mixture-containing vessel and leading upwardly therefrom to a maximum height and thence downwardly into the molten metal-receiving vessel, a heating means closely surrounding the molten metal outlet line throughout its length between the mixture containing vessel and the molten metal-receiving vessel, a molten ceramic outlet line of from about 1/4" to about 3/8" inner diameter and having an end-opening in the mixture-containing vessel from about 7/16" to about 1/2" above the end-opening in the molten metal exit line and leading upwardly out of the mixture-containing vessel to a maximum height from about 4 1/2" to about 14" higher than the said first level of maximum height in the molten metal outlet line and thence downwardly into the molten ceramic-receiving vessel, heating means closely surrounding the molten ceramic outlet line, a source of argon gas under pressure, a line therefrom leading into the gas-tight enclosure, and a control valve in the said line for admitting said argon gas into the said enclosure, whereby the pressure therein may be regulated.

References Cited by the Examiner
UNITED STATES PATENTS

| | | | |
|---|---|---|---|
| 1,983,297 | 12/34 | Lawrence | 73—401 |
| 2,356,013 | 8/44 | Spooner | 137—209 |
| 2,468,069 | 4/49 | Hunter | 210—83 X |
| 2,652,926 | 9/53 | Jernigan | 137—212 X |
| 2,767,848 | 10/56 | Beckett | 210—513 |
| 3,012,865 | 12/61 | Pellin | 23—308 |

REUBEN FRIEDMAN, *Primary Examiner.*

HERBERT L. MARTIN, *Examiner.*